United States Patent [19]

Carre

[11] Patent Number: 4,956,776
[45] Date of Patent: Sep. 11, 1990

[54] DEVICE FOR MANAGING AN ELECTROHYDRAULIC PRESSURE CONTROL

[75] Inventor: Jean-Claude Carre, Asnieres, France

[73] Assignee: Regie Nationale Des Usines Renault, Boulogne-Billancourt, France

[21] Appl. No.: 465,649

[22] Filed: Jan. 22, 1990

Related U.S. Application Data

[63] Continuation of Ser. No. 209,969, Jun. 22, 1988, abandoned.

[30] Foreign Application Priority Data

Jun. 22, 1987 [FR] France ................................. 87 08746

[51] Int. Cl.$^5$ ...................... G05B 13/02; G06F 15/00
[52] U.S. Cl. .................................. 364/424.1; 364/162; 364/184
[58] Field of Search ................ 364/149, 151, 160–163, 364/165, 180, 184, 187, 431.11, 424.1; 318/561, 563, 565, 590, 591, 611, 615

[56] References Cited

U.S. PATENT DOCUMENTS

| | | | |
|---|---|---|---|
| 4,338,832 | 7/1982 | Pelligrino | 74/866 |
| 4,578,747 | 3/1986 | Hideg et al. | 364/151 |
| 4,611,285 | 9/1986 | Weisman, II | 364/424.1 |
| 4,635,508 | 1/1987 | Tatsumi | 74/866 |
| 4,653,350 | 5/1987 | Downs et al. | 74/864 |
| 4,695,941 | 9/1987 | Kumar | 364/165 |

Primary Examiner—Allen MacDonald
Attorney, Agent, or Firm—Oblon, Spivak, McClelland, Maier & Neustadt

[57] ABSTRACT

A device for the management of a variable, particularly of a pressure relative to an electrohydraulic control of an automatic transmission. The device includes a control element associated with a second control element which generates the variable. The variable is processed by a sensor to give a measurement which is compared with a set point. The possible error $\epsilon$ is processed by a controller of the proportional-plus-integral-plus-derivative type which acts on the control element. The management device is provided with a table which generates a value based on the set point. This value is added to the value given by the controller and by the set point to act on the control element by way of a converter. The table is updated continuously during the stabilized phases of the variable with a correction that must be made so that the variable corresponds to the set point. The management device has a comparable operation in both the closed loop and open loop after a certain self-learning time.

2 Claims, 2 Drawing Sheets

DEVICE FOR MANAGING AN ELECTROHYDRAULIC PRESSURE CONTROL

This application is a continuation of application Ser. No. 209,969, filed on June 22, 1988, now abandoned.

BACKGROUND OF THE INVENTION

1. Field of the Invention:

This invention relates to a device for managing a variable particularly for an electrohydraulic pressure control of a motor vehicle automatic transmission.

2. Discussion of the Background:

In standard servosystems the malfunctioning of the measuring element causes the drift of the control value toward one of the stop values of the control, putting the system out of operation.

SUMMARY OF THE INVENTION

An object of this invention is to mitigate this drawback by making possible a comparable operation in closed loop and in open loop.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
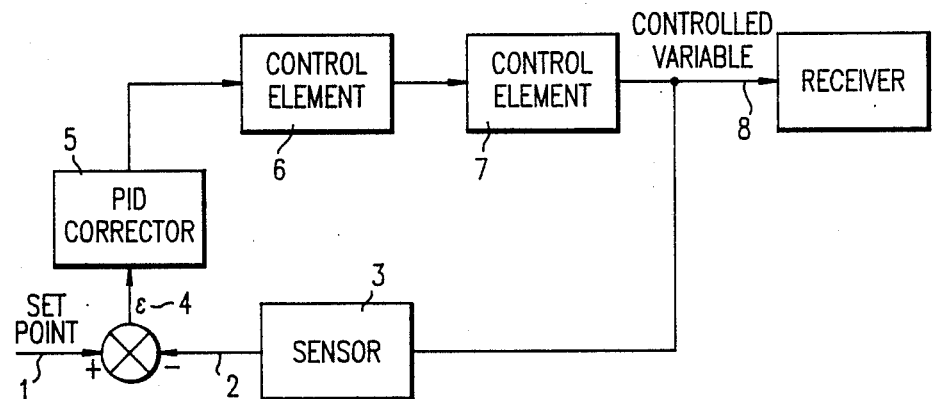
FIG. 1 shows a schematic diagram of a prior art device.

Various other objects, features and attendant advantages of the present invention will be more fully appreciated as the same becomes better understood from the following detailed description when considered in connection with the accompanying drawings in which like reference characters designate like or corresponding parts throughout the several views.

In standard servosystems (FIG. 1) set point 1 is compared with measurement value 2, delivered by a sensor 3. Error $\epsilon 4$ between these two quantities is then processed by a proportional-plus-integral-plus-derivative controller 5 (PID). The resultant signal controls a control element 6, for example a servovalve, itself controlling a second control element 7, for example a pressure limitation valve. Quantity 8 controlled by this second control element is the image of set point 1.

Figure 2:
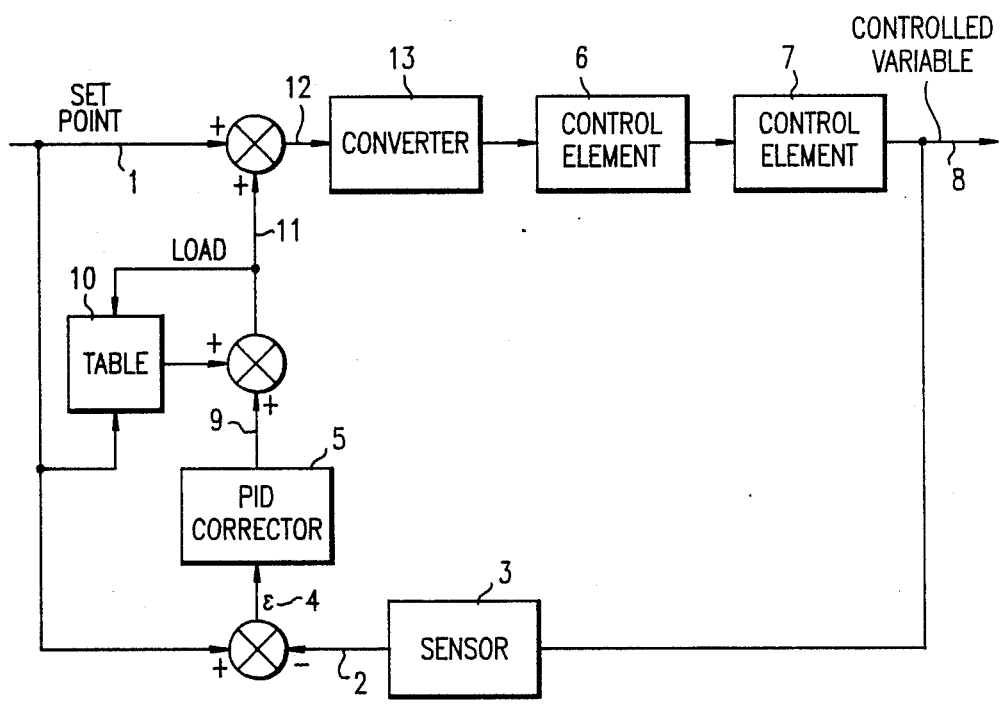
FIG. 2 shows a schematic diagram of the present invention according to a first embodiment.

If the sensor malfunctions there is no means for controlling quantity 8. To mitigate this possibility of failure, the controller has been modified, as is indicated in FIG. 2. Resultant signal 9 of proportional-plus-integral-plus-derivative controller 5 is added to a value read in table 10 as a function of set point 1. The loading of this table by signal 9 is performed at the address as a function of set point 1 and is updated continuously during stabilized phases of operation of controlled variable 8.

This stabilization of variable 8 can be detected by being assured that error signal $\epsilon 4$ has remained between two fixed values ($\pm \alpha$), for at least a given time (t). The values of $\alpha$ and t have to be defined as a function of the system. Quantity 9 developed by the controller is equal to $$k_p \epsilon + k_D \frac{d\epsilon}{dt} + k_i \int \epsilon dt.$$

During stabilized phases, there remains only $$k_i \int \epsilon dt;$$

this amount is cancelled after having been summed with the amount which was previously found in the table for the corresponding set point. Result 11 of the sum of signal 9 with the contents of table 10 is itself added to set point 1. Result 12 of this summing makes it possible, by means of a converter 13 either by computing a mathematical function, or by looking in a table, to define the control quantity of control element 6. This configuration makes it possible, in case of opening of the servoloop by malfunctioning of the sensor or of its connecting elements, cancelling information 5, to continue to assure an by continuing to control the converter based on the value of the result 12, operation comparable to the one that there was in closed loop, for a limited period making it possible to reach a repair center. This system makes it possible to compensate for the slow drifts, both in closed loop and in open loop, and to have operation characteristics identical in both cases, after a certain learning time.

Figure 3:
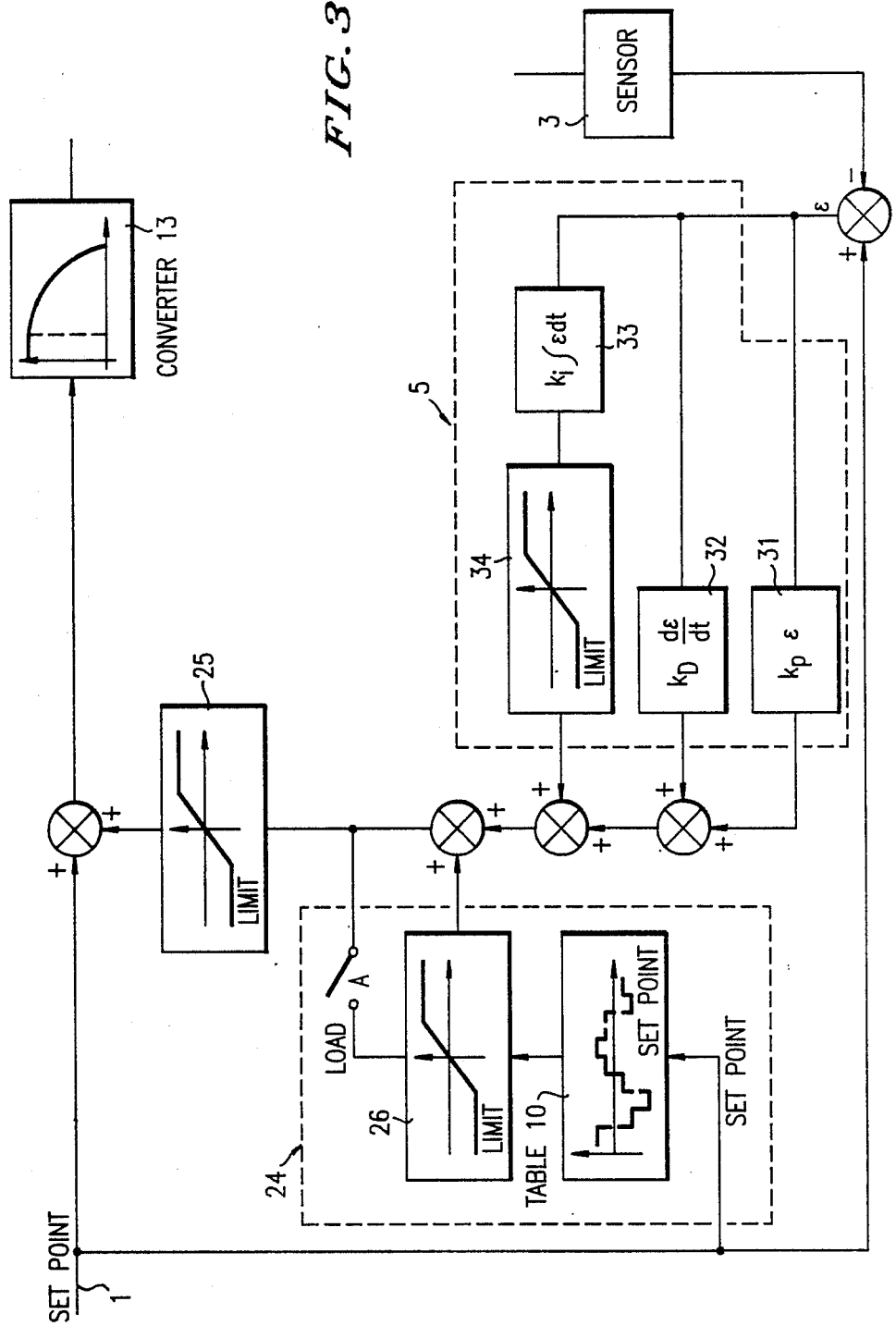
FIG. 3 is a schematic diagram showing a second embodiment of the present invention.

The error between the set point of line pressure and the pressure value actually read by the sensor is processed by a standard PID corrector whose low value coefficients for the proportional correction assure a good precision thanks to the integral correction in the operating ranges under stabilized conditions. FIG. 3 shows the proportional, derivative and integral corrections 31, 32 and 33, respectively. The op-rating range of the integral correction is set by limit device 34. The precision during set point changes is assured by an additional correction stored in a table known as "self-adaptivity table", of errors under stabilized conditions.

Self-adaptive table 10

In the control program, a particular table has been created that is addressable by the pressure set point its updating is performed continuously during the stabilized phases of the line pressure with the correction that had to be made for the line pressure to correspond to the set point pressure.

Thus, during interim phases, the modulation pressure which controls second control element 7 is already corrected by the value which was previously loaded into table 10 for this set point value during prior phases under stabilized conditions.

Control element 6 is a quick flap valve, normally open, current-controlled by electric signals coming from computers.

This control is performed at a fixed frequency (100 Hz) by signals of the call/maintain type (3.3 Amp, 1.7 Amp) chopped at a frequency of 7 kHz to reduce the power dissipated by the controlling transistors.

The delivery pulsed by this solenoid valve or control element 6 and integrated by second control element 7 generates a pressure developing between 0.5 for and 3 for as a function of the cyclic ratio.

Control element 7 is a pressure limitation valve which makes it possible to divert to the tank the surplus flow provided by the pump, to assure the desired line pressure. To reduce the pressure oscillations caused by the modulation solenoid valve operating at 100 Hz, the valve is damped by a jet.

Self-adaptive table 10

If error $\epsilon$ remains between 2"±Alpha" values for a time of "n" loop turns of the general program, this value is loaded into table 10 at the address of pressure set point 1.

"ALPHA" and "n" must be selected so that the table is filled quickly but only with stable values.

Element 26: The correction values able to be loaded into the table are limited to ±"LIMIT." The values loaded into the table are used for the correction both in open loop and in closed loop.

Element 25: The value of the total correction is limited to ±"LIMIT."

MONITORING OF THE PRESSURE LOOP

Static monitoring of pressure sensor 3

It is verified that the voltage delivered by the pressure sensor is greater than 2.5% of its power supply voltage.

Monitoring of electrohydraulic unit 6 and 7 outside control

For a cyclic ratio of 100%, it is verified that pressure read by the pressure sensor is less than 6 bars. (It should normally be at a lower value).

For a cyclic ratio of 0%, it is verified that the line pressure is greater than 7 bars. (It should normally be at a higher value).

DYNAMIC MONITORING OF THE CONTROL

Monitoring of the interims

It is performed at the level of the production of error $\epsilon$. If this error $\epsilon$, at the moment of the test, is greater than an error definition value, an error is registered.

Monitoring of slow drifts

If the running total of the correction given by the table and of the error after processing by the PID is greater than a limiting "LIMIT" value, an error is registered.

Remarks (1.) The running total of the number of errors, without interruption up to a given value as a limit, causes a failure.

(2.) Any test no longer registering an error reinitializes the counter.

MONITORING OF EVM 6

When a number of errors corresponding to the limit values has been accounted for, a test makes it possible to check the electric circuit of the EVM. If a gear change is not being made, three successive controls of EVM at 40% are begun during which it is verified that the rising time of the call current is located between 2 values.

If a failure is then detected, an "EVM" failure is stored in memory and an automatic transmission safeguard gear is shifted into, otherwise a "PL" failure is stored in memory and a limphome gear is also shifted into.

What is claimed:

1. A system for regulating a parameter, comprising:
   an input for receiving a set point signal;
   a first control element having an input and an output;
   second control element receiving the output of said first control element and producing an output for regulating said parameter;
   a sensor connected to the output of said second control element;
   a comparator for comparing the output of said sensor with said set point signal to produce an error signal;
   a proportional-plus-integral-plus-derivative controller receiving said error signal and producing an output;
   a table being addressed by said set point signal to produce a value in response thereto;
   means for adding said value, the output of said proportional-plus-integral-plus-derivative controller and the set point signal to produce an output;
   a converter receiving the output of said adding means to produce an output connected to the input of said first control element, said converter thus continuing to provide an output even in the event of the failure of said sensor.

2. A system according to claim 1, wherein said parameter is the electrohydraulic pressure of an automatic transmission, said system further comprising a limiting element connected to said means for adding for detecting an operating anomaly and for causing said automatic transmission to use a limp-home gear in response thereto.

* * * * *